US 6,946,793 B1

(12) United States Patent
Nelson

(10) Patent No.: US 6,946,793 B1
(45) Date of Patent: Sep. 20, 2005

(54) PLASMA REACTOR DESIGN FOR TREATING AUTO EMISSIONS—DURABLE AND LOW COST

(75) Inventor: David Emil Nelson, Waterford, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/517,681

(22) Filed: Mar. 2, 2000

Related U.S. Application Data

(60) Provisional application No. 60/141,394, filed on Jun. 29, 1999.

(51) Int. Cl.⁷ .......................... H01J 17/49; B01J 19/08
(52) U.S. Cl. .................. 313/582; 422/186.04; 60/275; 445/58
(58) Field of Search .................. 445/58; 313/582–587; 428/186.04; 60/275

(56) References Cited

U.S. PATENT DOCUMENTS

| | | |
|---|---|---|
| 6,338,827 B1 | 1/2002 | Nelson et al. |
| 6,354,903 B1 | 3/2002 | Nelson |
| 6,368,451 B1 | 4/2002 | Goulette et al. |
| 6,423,190 B2 | 7/2002 | Hemingway et al. |
| 6,464,945 B1 | 10/2002 | Hemingway |
| 6,482,368 B2 | 11/2002 | Hemingway et al. |
| 6,537,507 B2 | 3/2003 | Nelson et al. |
| 6,638,484 B2 | 10/2003 | Nelson et al. |

*Primary Examiner*—Joseph Williams
(74) *Attorney, Agent, or Firm*—Paul L. Marshall

(57) ABSTRACT

A non-thermal plasma reactor and method for preparing same for conversion of exhaust gas constituents is prepared from an extruded monolith comprising a plurality of conductive and exhaust channels separated by substantially planar dielectric barriers. Conductive material printed onto selected monolith channels form the conductive channels, which are connected along bus paths to form an alternating sequence of polarity, separated by exhaust channels. Conductive channels and channels not selected for exhaust flow are plugged to exclude exhaust gases and to prevent electrical leakage. During operation, exhaust gas flows through exhaust channels and is treated by the high voltage alternating current flowing through the conductive channels. The substantially planar dielectric barriers provide a uniform electrical response throughout the exhaust channels. In a preferred embodiment, the monolith comprises a perimeter boundary wall of increased wall thickness to provide electrical insulation between the conductive channels and the housing and to further provide robust crush resistance when inserting the element into a reactor housing. The one-piece monolith is specifically designed for fabrication via extrusion. A minimal number of in-line structural ligaments are preferably extruded as part of the monolith for providing optimal structural support while minimizing backpressure losses.

41 Claims, 4 Drawing Sheets

PLASMA REACTOR DESIGN FOR TREATING AUTO EMISSIONS—DURABLE AND LOW COST

CROSS-REFERENCE TO RELATED APPLICATIONS

The present application claims priority to U.S. provisional application Ser. No. 60/141,394 filed Jun. 29, 1999 by David E. Nelson entitled "Plasma Reactor Design for Treating Auto Emissions —Durable and Low Cost,".

TECHNICAL FIELD

This invention relates to reactors for chemical reduction of nitrogen oxide (NOx) emissions in the exhaust gases of automotive engines, particularly diesel and other engines operating with lean air fuel mixtures that produce relatively high emission of NOx. More particularly, the invention pertains to an improved non-thermal plasma reactor for use with diesel engines and the like and an improved method for preparing same.

BACKGROUND OF THE INVENTION

In recent years, non-thermal plasma generated in a packed bed reactor has been shown to be effective in reducing nitric oxides (NOx) produced by power plants and standby generators. These units usually have a reducing agent, such as urea, to enhance the conversion efficiency. The packed bed reactor consists essentially of a high voltage center electrode inserted into a cylinder of dielectric material, usually a form of glass or quartz.

An outside or ground electrode is formed by a coating of metal in various forms, including tape, flame spray, mesh, etc. The space between the center electrode and the inside diameter of the dielectric tube is filled or packed with small diameter glass beads. When high voltage alternating current is applied to the center electrode, the surfaces of the beads go into corona, producing a highly reactive and selective surface for inducing the desired reaction in the gas.

Unfortunately, the packed bed design with its loose beads and glass dielectric is impractical for use in the conditions found in a mobile emitter, such as a car or truck. The vibration and wide temperature swings of the vehicle system would damage the packed bed and the necessary temperature and vibration isolation needed to make it survive would not be cost effective.

A stacked plate reactor for use with diesel engines and other engines operating with lean air fuel mixtures is disclosed in commonly assigned U.S. patent application Ser. No. 09/465,073 entitled "Non-thermal Plasma Exhaust NOx Reactor," which is hereby incorporated by reference herein in its entirety. Disclosed therein is a reactor element comprising high dielectric, nonporous, high temperature insulating means defining a group of relatively thin stacked cells forming gas passages and separated by the insulating means. Alternate ground and charge carrying electrodes in the insulating means on opposite sides of the cells are disposed close to, but electrically insulated from, the cells by the insulating means. The electrodes may be silver or platinum material coated onto alumina plates. Conductive ink is sandwiched between two thin nonporous alumina plates or other suitable insulating plates to prevent arcing while providing a stable electrode spacing for a uniform electric field. The electrodes are coated onto alumina in a pattern that establishes a separation between the electrodes and the connectors of alternate electrodes suitable to prevent voltage leakage.

In commonly assigned U.S. Provisional Application Ser. No. 60/141,427 filed Jun. 29, 1999 entitled "Design and Method of Manufacturing a Plasma Reactor for Treating Auto Emissions —Stacked Shapes," which is also hereby incorporated by reference herein in its entirety, a non-thermal plasma reactor element is prepared from formed building blocks of dielectric material. The formed shape defines an internal cell in the plasma reactor having an exhaust passage for flowing exhaust gas to be treated therethrough. Individual cells are provided with a conductive print disposed thereon to form electrodes and connectors. In a preferred embodiment, the conductive print comprises a continuous grid pattern having a cutout region disposed opposite the terminal connector for reducing potential voltage leaks. Multiple cells are stacked and connected together to form a multi-cell stack.

Commonly assigned U.S. Provisional Application Ser. No. 60/141,401 filed Jun. 29, 1999 entitled "Method of Manufacturing A Plasma Reactor For Treating Emissions —Durable and Low Cost," which is hereby incorporated by reference herein in its entirety, and commonly assigned U.S. Provisional Application Ser. No. 60/141,403 filed Jun. 29, 1999 entitled "Design and Method Of Manufacture Of a Plasma Reactor With Curved Shape For Treating Auto Emissions," which is also incorporated by reference herein in its entirety, disclose a reactor and method for preparing same, respectively. The reactor is characterized by a reactor element prepared from a curved, swept-shaped substrate specifically designed for fabrication via extrusion. The as-extruded curved substrate comprises a thick outer wall surrounding a plurality of channels separated by dielectric barriers. Selected channels are coated with a conductive material to form conductor channels. The prepared reactor element comprises multiple concentric exhaust channels, multiple concentric conductor channels having alternating polarity, each connected to its respective polarity via bus paths, in-line structural support ligaments for providing optimal structural support while preventing exhaust leakage, and thick outer walls providing high crush resistance and allowing robust mounting into the reactor housing.

While the above non-thermal plasma reactors meet some of the current needs and objectives, there remains a need in the art for an improved, durable, low cost non-thermal plasma reactor and improved method of manufacturing same. There further remains a need for a non-thermal plasma reactor that can be prepared with reduced manufacturing complexity, reduced number of components and reduced overall material cost.

SUMMARY OF THE INVENTION

A non-thermal plasma reactor for conversion of exhaust gas constituents comprises a reactor element prepared from an extruded monolith of dense dielectric material having substantially planar internal features. The monolith comprises a plurality of channels separated by substantially planar dielectric barriers and a perimeter boundary wall. Conductive material printed onto selected channels forms conductive channels that are connected along bus paths to form an alternating sequence of polarity, separated by exhaust channels. Conductive channels and channels not selected for exhaust flow are plugged at end portions of the monolith with a material suitable for excluding exhaust gases and for preventing electrical leakage between conductive channels. Exhaust channels, disposed between opposite polarity conductive channels, are left uncoated and unplugged. During operation, exhaust gas flows through exhaust channels and is treated by high voltage alternating current flowing through the conductive channels. The substantially planar internal monolith features provide a uniform electrical response throughout the exhaust channels.

In a preferred embodiment, the monolith comprises a perimeter boundary wall of increased wall thickness to provide electrical insulation between the conductive channels and to further provide robust crush resistance when inserting the element into a reactor housing.

The present one-piece monolith is specifically designed for fabrication via extrusion. A minimal number of in-line structural ligaments are preferably extruded as part of the monolith for providing optimal structural support while minimizing backpressure losses. The present non-thermal plasma reactor provides the dual advantages of low cost and durable design.

The present method for preparing a non-thermal plasma reactor element comprises extruding a monolith comprising a perimeter boundary wall and a plurality of substantially planar dielectric barriers separating a plurality of channels for forming exhaust channels and conductive channels; selectively coating selected channels with a conductive material to form conductive channels; and applying a barrier coating to said conductive channels. Selective coating preferably comprises supplying a mask to the extruded monolith, coating the masked monolith with conductive material, with drying, and firing, as needed, to form the conductive channels. Masking may be repeated for applying a barrier coating to cover the conductive channels, with drying, and firing (as needed). Electrical connections are made, typically by attaching terminations to the bus paths with insulating connects, wrapping an insulator, such as an intumescent matt, around the monolith, inserting shielded wire through the reactor housing, and installing the monolith into a housing.

The method provides reduced fabrication complexity over prior manufacturing methods. For example, the method provides coating the monolith channels at the same time. Firing cycles occur with the entire monolith rather than as multiple pieces coated and fired separately. High durability is achieved via fabrication using material such as, but not limited to, dense cordierite, alumina, titania, mullite, plastic, and other high dielectric constant materials, or combinations thereof, the presence of structural ligaments, and thick perimeter monolith walls. Further, the enhanced control of monolith wall thickness achieves a uniform electrical response and stable plasma. The dielectric channels contain the conductors while providing resistance to voltage leakage while a dielectric coating prevents voltage leakage at channel ends. Overall cost is significantly reduced over currently known wire, tubular, and stacked plate designs, due to the low cost of the monolith substrate and the minimal secondary processing of the present method.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures.

DESCRIPTION OF THE PREFERRED EMBODIMENT

Figure 1:
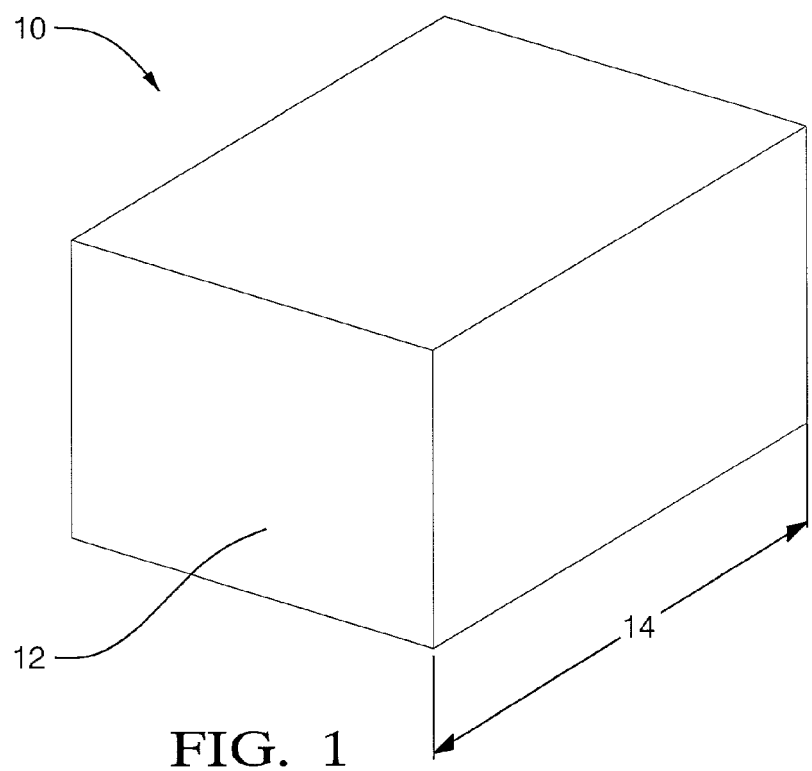
FIG. 1 provides a perspective view of an extruded monolith in accordance with the present invention.

Turning now to the several FIGURES, FIG. 1 provides a perspective view of the present extruded monolith 10 for preparing the portion of the non-thermal plasma reactor where the conversion of exhaust gas is carried out (hereinafter referred to as the reactor "element"). The extruded monolith 10 has a frontal area 12 and a length 14. Frontal area 12 may be rectangular, square, round, or any desired shape. Internal features of the extruded monolith 10 are substantially planar, as shown in FIG. 2.

Figure 2:
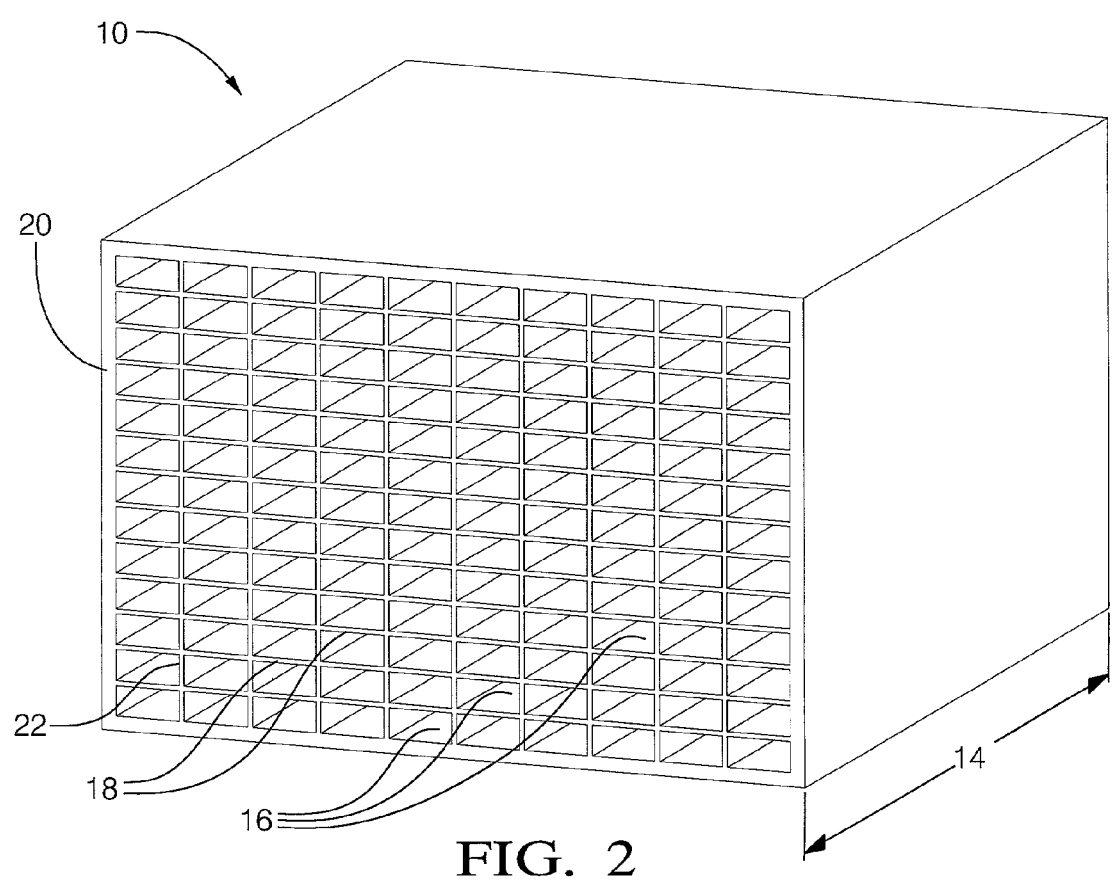
FIG. 2 provides an alternate view of the monolith of FIG. 1, showing additional detail of the monolith face.

FIG. 2 provides a view of additional detail of the as-extruded monolith 10 shown in FIG. 1. As-extruded monolith 10 comprises a plurality of channels 16 defined and separated by substantially planar dielectric barriers 18 and surrounded by perimeter boundary wall 20. The extruded monolith 10 preferably further comprises structural support ligaments 22, integrally formed as part of the extruded monolith 10.

Channels 16 are bounded by common substantially planar dielectric barriers 18. Perimeter boundary wall 20 of substantially increased wall thickness relative to barriers 18 forms the perimeter of the extruded monolith 10. The increased thickness of perimeter boundary wall 20 enhances the reactor's ability to withstand localized stresses imparted from the retention system (not shown) during manufacture as well as from localized loads that may be imparted during system operation. The increased perimeter boundary wall 20 thickness also serves to impart robust electrical isolation between the reactor element and the reactor housing. The perimeter boundary wall 20 may have a thickness ranging from, for example, about 0.5 millimeters to about 5 millimeters.

The frontal area 12 and length 14 (best seen in FIG. 1) of the extruded monolith 10 may each be selected so as to optimize fit, cost, and performance requirement variables of individual systems. Increasing the frontal area 12 decreases the space velocity of the exhaust gas and may significantly increase the conversion efficiency of the reactor. Increasing the length 14 may provide some effect; however, adjusting the length 14 generally has a less significant effect under typical operating conditions. Advantageously, an optimal combination of frontal area 12, length 14, and reactor size are selected in accordance with specific vehicle emissions criteria.

The space velocity of gas passing through a plasma reactor can be very high, with levels that may exceed 1 million inverse hours. The present invention achieves a low backpressure while taking advantage of the capability for a very high gas space velocity by providing a shape comprising a large frontal area 12 and a relatively short length 14. In a preferred embodiment, the extruded monolith 10 comprises a frontal area 12 that is sufficiently large to achieve a low backpressure while the length 14 is adjusted to achieve the desired gas space velocity in accordance with the particular engine emission system.

Figure 3:
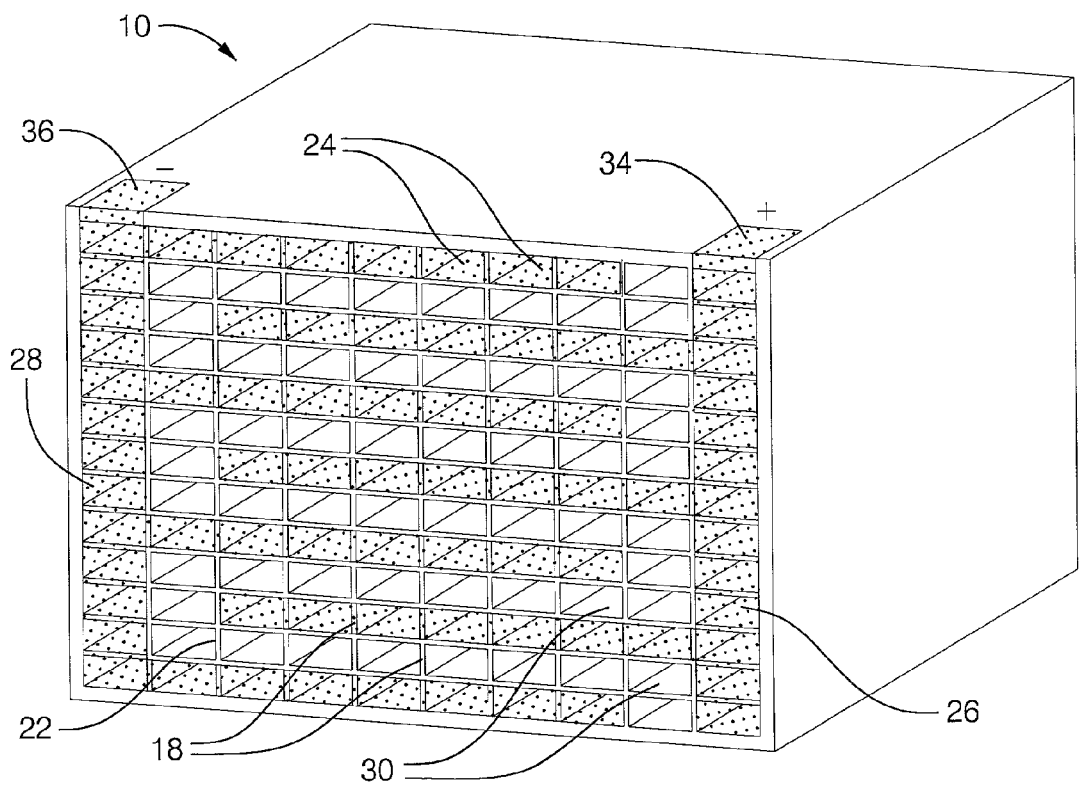
FIG. 3 provides a view of the present monolith after coating to form conductive channels.
Figure 4:
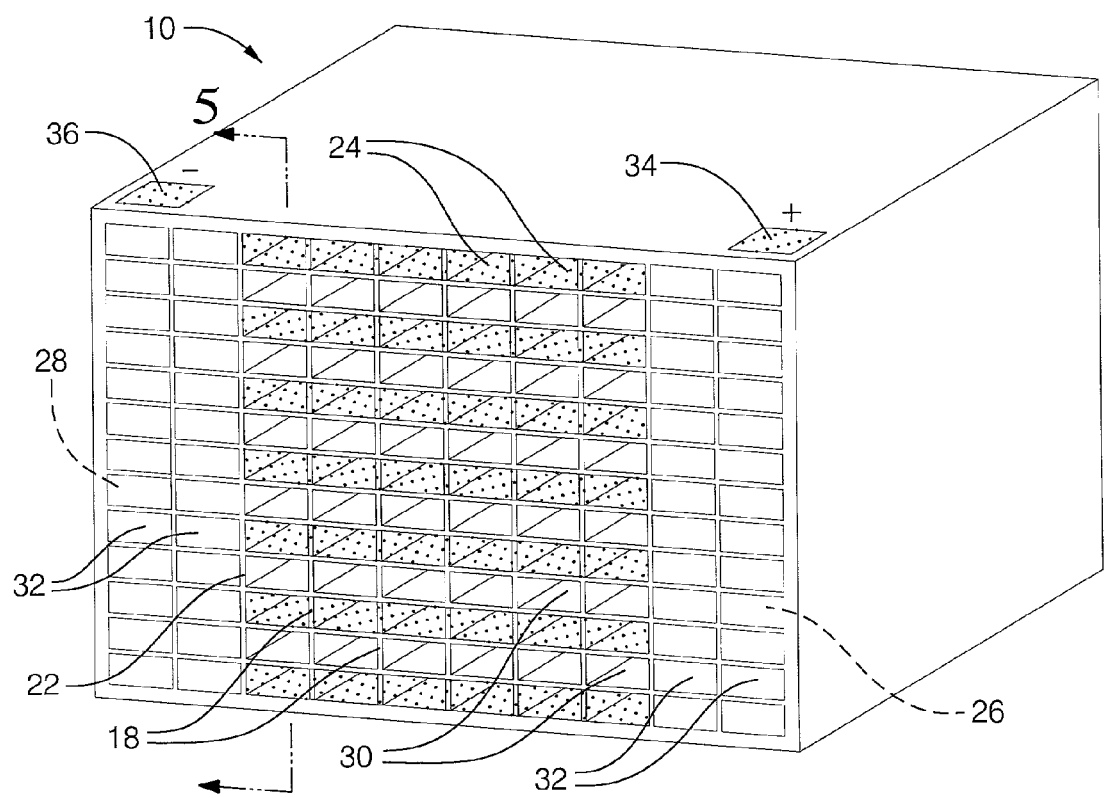
FIG. 4 provides a view of the present monolith having selected channels plugged.

FIG. 3 provides a view of the planar monolith 10 of FIGS. 1 and 2, after coating. Conductive material printed onto selected channels 16 form conductive channels 24 that are connected along bus paths 26, 28 to form an alternating sequence of polarity, separated by exhaust channels 30. As shown in FIG. 4, conductive channels 24 and channels not selected for exhaust flow are preferably formed into plugged channels 32 at end portions of the monolith by plugging with a material suitable for excluding exhaust gases and for preventing electrical leakage between conductive channels 24. Typically, exhaust channels 30, disposed between opposite polarity conductive channels 24, are left uncoated and unplugged. A catalytic coating may be disposed on exhaust channel 30 walls to promote reactions.

The extruded monolith 10 defines one or more planar "cells," each cell comprising a relatively tall (tall relative to the conductive channel 24) exhaust channel 30, a dense dielectric barrier 18, a relatively narrow conductive channel 24, and another dense dielectric barrier 18. One possible embodiment of the present reactor element, comprises a relatively tall exhaust channel 30 having a maximum dimension of about 0.5 to about 3 millimeters, a dense dielectric barrier 18 having a maximum dimension of about 0.25 to about 1.5 millimeters, a relatively narrow conductive channel 24 having a maximum dimension of about 0.1 to about 1.0 millimeters, and another dense dielectric barrier 18 having a maximum dimension of about 0.25 to about 1.5 millimeters. In one embodiment, equal sized conductive channels 24 are used to develop plasma. Alternate embodiments utilize defined templates (tooling) for custom extrusion of conductive channels 24 having varying dimensions.

FIG. 3 shows a six-cell monolith 10. The number of cells utilized in a particular embodiment of the present nonthermal plasma reactor may vary depending upon the space velocity of the exhaust and the relative quality of the incoming exhaust gas. Generally, about 5 to about 200 cells are employed to achieve conversion of typical automotive type exhaust gas constituents.

The present method comprises forming the monolith 10, selectively coating the formed monolith 10, and firing and drying, as needed. In preparing the present reactor element from the extruded monolith 10, thin conductive channels 24 are coated with a conductive media. Preferably, the conductive media is intimately disposed against the interior walls of the conductive channels 24 so as to enhance electron injection into the dielectric substrate comprising the monolith 10. Preferably, selective coating and applying a barrier coating comprises applying a first mask to the monolith 10; applying a conductive coating material to form conductive channels 24; drying the coated monolith; firing the coated monolith 10; removing the first mask, if necessary; applying a second mask to the coated monolith 10; applying a barrier coating; allowing said barrier coating to dry; and firing the monolith.

The conductive channels 24 are connected alternately with first positive and then negative polarity electric field, repeatedly. In a preferred embodiment, the conductive channels 24 are connected using internal conducting paths to a common bus path for each polarity. For example, as shown in FIG. 3, on one side of the substrate 10, the positive conductive channels 24 (indicated by plus signs "+") extend slightly further than the negative thin conductive channels 24 (indicated by negative signs "−") allowing the positive conductive channels 24 to connect with a positive bus path 26. Similarly, on the opposite side of the monolith 10, the negative conductive channels 24 extend slightly further than the positive conductive channels 24 allowing the negative conductive channels 24 to connect with a negative bus path 28. The bus paths 26, 28 are connected to positive and negative termination pads 34 and 36, respectively, located exterior to the monolith 10. Wires connect the monolith 10 through a reactor housing wall to an electrical power source (not shown). The bus paths 26, 28 may be located on the face 12 of the monolith 10. Alternately, three-dimensional conductive media may be used to dispose the bus paths 26, 28 along the path of the conductive channels 24. In another embodiment, the bus paths 26, 28 may comprise a surface print disposed on a top region of the face 12.

Optionally, the portion of the dielectric structural support ligaments 22 disposed within the conductive channels 24 may be coated with conductive media, if desired. When thus coated, the support ligaments 22 further serve to achieve a uniform plasma discharge by maintaining a substantially constant voltage along the horizontal and depth dimensions of the conductive channels 24. Dielectric structural support ligaments 22 may be left uncoated, to reduce conductive material usage for applications that can tolerate increased voltage variation. Dielectric structural support ligaments 22 provided in exhaust channels 30 are not coated.

In certain applications, dielectric structural support ligaments 22 are employed to provide improved structural capability within bus paths 26, 28. In these embodiments, a jumper may be utilized to assure a continuous current path between the conductive channels 24 and the termination pads 34, 36. Alternatively, a portion of the structural ligaments 22 may be removed at one or both ends of the monolith 10 prior to coating the conductive channels 24 and bus paths 26, 28 so as to provide a current path through the support ligaments 22 while still allowing the ligaments 22 to provide structural support for most of the monolith 10.

As shown in FIG. 4, the present reactor and method preferably further comprises plugging each conductive channel 24 and bus path 26, 28 (if coated) to provide plugged channels 32 after the conductive channel walls are wet by the conductive media to prevent flow. Any suitable flow barrier material may be utilized for sealing the passages, including, but not limited to, extra conductive material, dielectric coating, mask, or a combination thereof. The end regions of the reactor may be coated with a dielectric encapsulent to inhibit voltage leakage from the ends of the reactor. This is particularly desirable when conductive material is used as a flow barrier in order to prevent voltage leakage while protecting the conductive material from oxidation.

The monolith 10 (which is now the reactor element) is formed into a non-thermal plasma reactor with wrapping or custom-formed insulation or support. In a preferred embodiment, an intumescent type insulating matt is disposed between the metal reactor housing and the monolith 10. The matt support expands after installation and provides high holding force thus preventing the monolith 10 from shifting in the reactor housing. This is particularly advantageous for stabilizing the monolith 10 within the reactor housing during operation, when high operating temperatures cause housing expansion and thus increase the distance between the monolith 10 and the reactor housing. An insulating seal (not shown) is preferably provided in the area of the monolith-wire terminations 34, 36 over the connection to prevent voltage leaks through the matt support. The matt support may optionally comprise an insulator.

The wire system connects the monolith 10 to a power source through the reactor housing. The wire system may use a strain relief to achieve highly reliable connections with the monolith 10. The matt further serves to protect the wire system from elevated temperatures.

Figure 5:
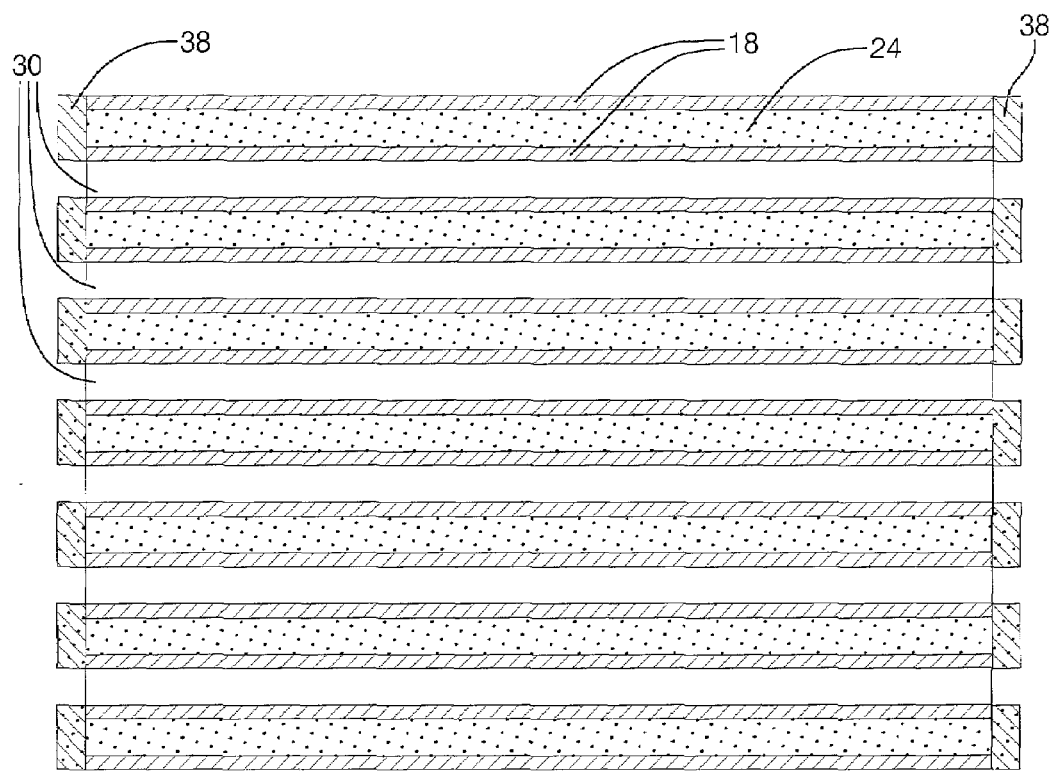
FIG. 5 provides a section view taken along the line 5—5 of FIG. 4 of an embodiment of the present invention having an additional insulating barrier.

FIGS. 5–8 provide side sectional views of the monolith 10, taken along the line 5—5 of FIG. 4, showing various possible embodiments prepared in accordance with the present invention. FIG. 5 shows an embodiment employing an insulating barrier 38 for preventing voltage leaks at ends of the monolith 10 having conductive media near the surface and for further sealing off conductive channels 24 to prevent exhaust flow and oxidation.

Figure 6:
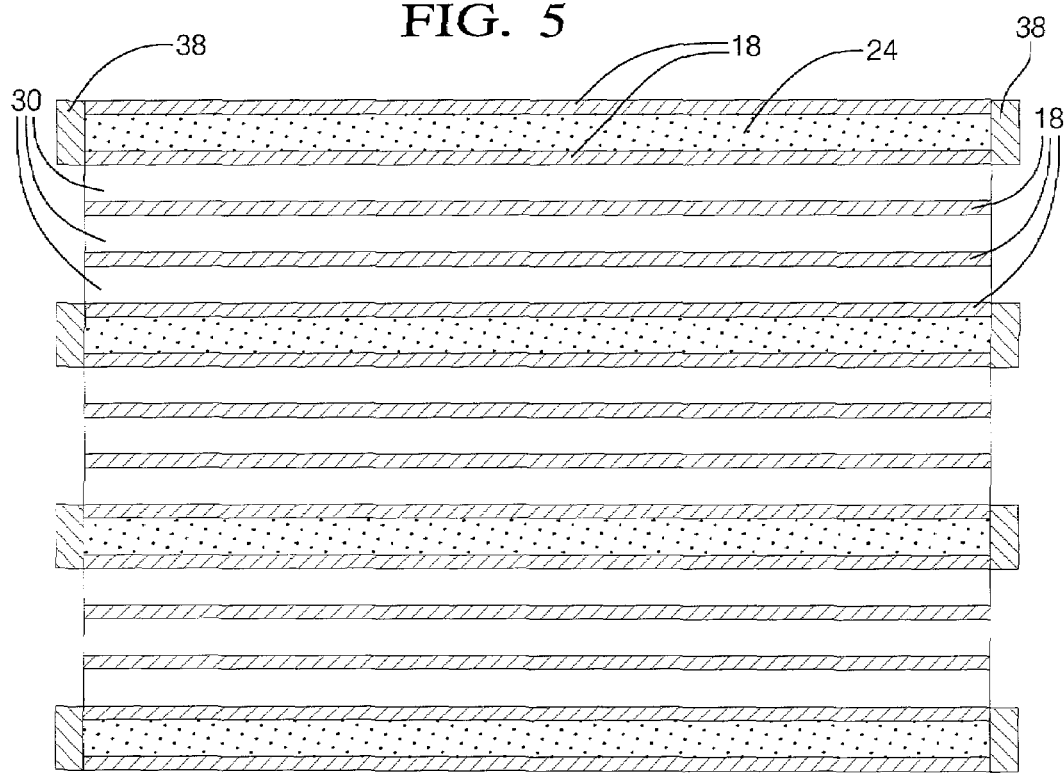
FIG. 6 provides a section view taken along the line 5—5 of FIG. 4 of an embodiment of the present invention having an additional insulating barrier and multiple exhaust channels disposed between conductive channels.
Figure 7:
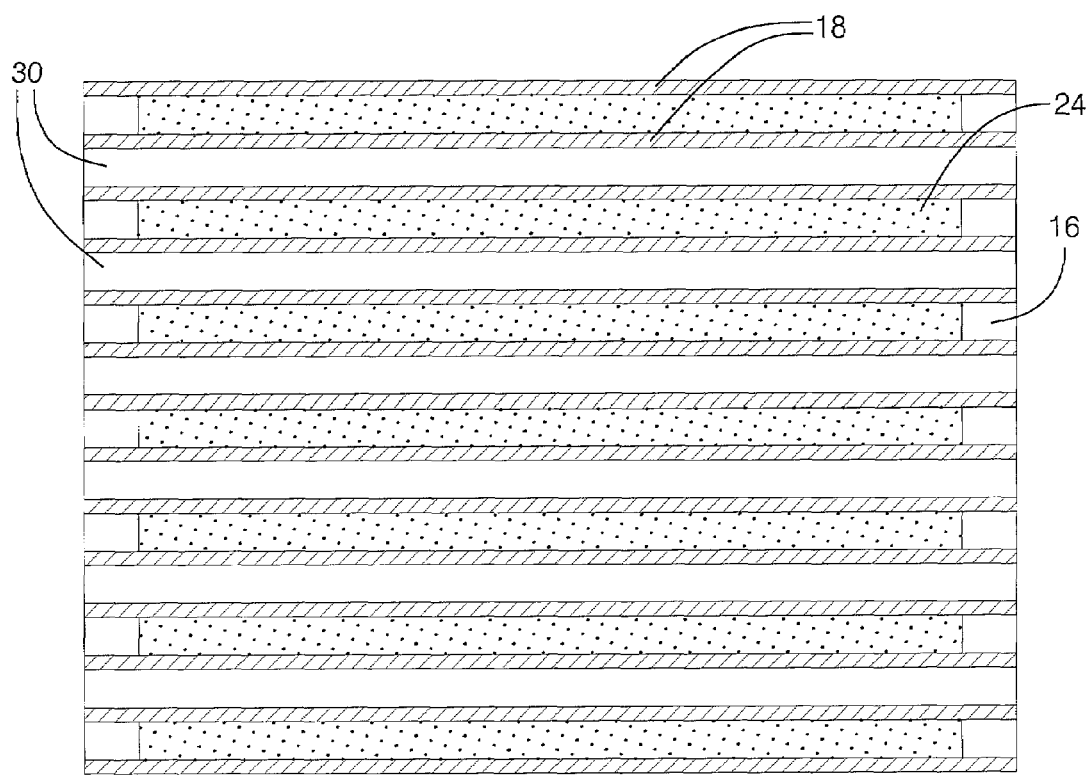
FIG. 7 provides a section view taken along the line 5—5 of FIG. 4 of an embodiment of the present invention having abbreviated conductive layers.
Figure 8:
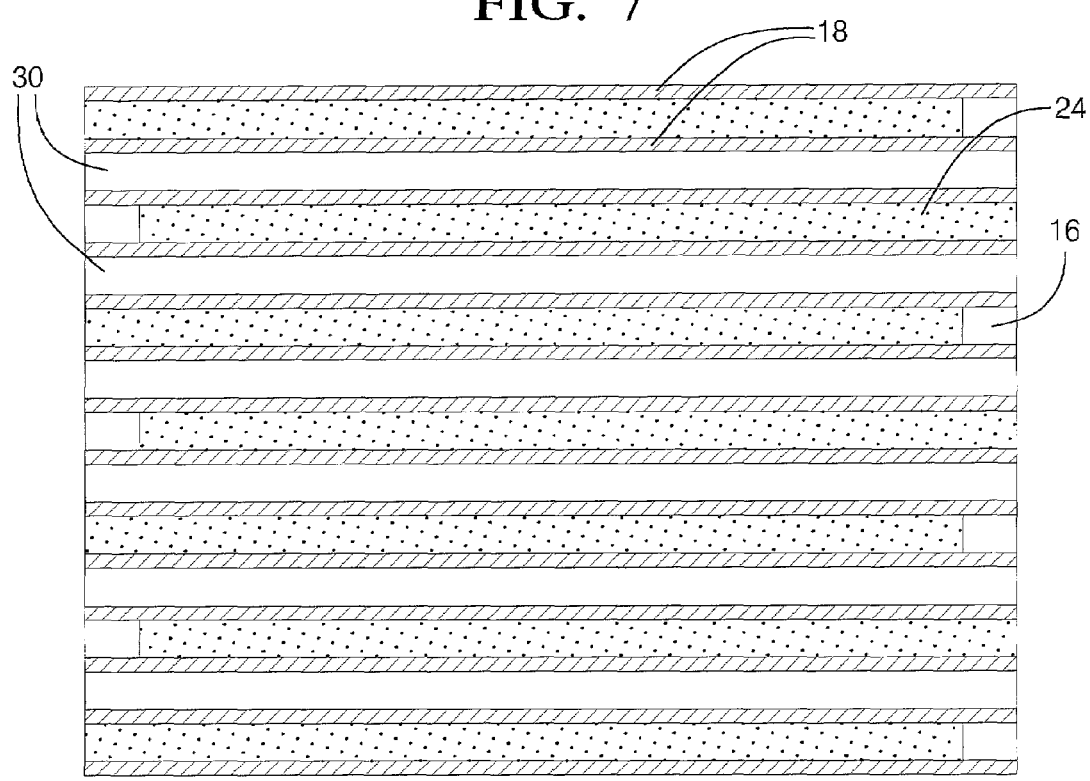
FIG. 8 provides a section view taken along the line 5—5 of FIG. 4 of an embodiment of the present invention having alternating abbreviated conductive layers.

Additional embodiments for distributing conductive media and preventing voltage and exhaust leakage at substrate ends are shown in FIGS. 6–8. In FIG. 6, multiple exhaust channels 30 separated by dielectric barriers 18 are provided between conductive channels 24. In the embodiment of FIG. 6, three exhaust passages 30 are provided between two conductive channels 24. This configuration provides reduced backpressure for a given frontal area 12 and increases the amount of exhaust gas than can be treated. This embodiment provides the further advantage of reduced coating costs. The number of exhaust passages 30 disposed between conductive channels 24 is selected based upon the dielectric strength of the dielectric barrier 18 material and the maximum voltage capacity of the reactor power supply system.

In the embodiments of FIGS. 7 and 8, the optional insulating barrier 38 is not provided at the monolith 10 ends. The embodiment shown in FIG. 7 contains the conductive media disposed in the conductive channels 24 at a distance from each end of the monolith 10. For example, coating may be applied so as to dispose the conductive media from about 5 to about 15 millimeters from opposite ends of the monolith 10. In FIG. 8, a staggered coating pattern is employed wherein the conductive media stops short at alternate ends of the monolith 10. For example, in alternating conductive channels 24, a section about 10 to about 30 millimeters from opposite end portions of conductive channels 24 are uncoated.

In an alternate embodiment, the present method comprises extruding a monolith having narrow conductive channels 24 at each parallel step level. Thick exhaust channels 30 are centered across each barrier 18 layer thickness and extend substantially across the full width of each layer 18. Preparation comprises extruding a ceramic monolith substrate, coating the walls of the conductive channels 24 with conductive material, firing, and optionally cutting off a slight portion at each channel end to assure electrical isolation between layers. Robust electrical connections are then provided, preferably from the front and back regions of the extruded monolith 10.

In yet another embodiment of the present method, a co-extruded ceramic-metal foil monolith is provided. The method comprises co-extruding a ceramic substrate with metallic foils providing a conductive channel that is integrally covered by dielectric material. A near continuous process may be employed such as, for example, firing the co-extruded ceramic monolith-metallic foil "log" using a continuous type kiln and separating the "log" into desired lengths with a traveling dicing saw. Robust electrical connections are provided along the side of the monolith by running the metallic foil outside the ceramic edges during extrusion.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A non-thermal plasma reactor characterized by:
   an element prepared from a monolith comprising a plurality of channels separated by substantially planar dielectric barriers and a perimeter boundary wall, said element comprising:
   a plurality of exhaust channels for passing a flow of gas therethrough; and
   a plurality of conductive channels connected alternately with first positive and then negative polarity electric field.

2. The reactor of claim 1, wherein said monolith is formed by extrusion.

3. The reactor of claim 1, wherein said conductive channels form an alternating sequence of polarity separated by said exhaust channels.

4. The reactor of claim 1, wherein multiple exhaust channels are provided between said conductive channels.

5. The reactor of claim 1, wherein said perimeter boundary wall is of substantially increased thickness relative to said dielectric barriers.

6. The reactor of claim 1, wherein said monolith comprises a frontal area and a length selected so as to optimize fit, cost, conversion efficiency, or a combination thereof, of said non-thermal plasma reactor.

7. The reactor of claim 1, wherein said monolith comprises a frontal area that is sufficiently large to achieve a low backpressure and wherein monolith length is adjusted to achieve a desired gas space velocity in accordance with particular engine emissions.

8. The reactor of claim 1, wherein said conductive channels comprise conductive material disposed upon selected areas of selected channel walls.

9. The reactor of claim 1, wherein conductive media is intimately disposed against interior walls of said conductive channels so as to enhance electron injection into said monolith.

10. The reactor of claim 1, wherein said conductive channels are plugged with a flow barrier material.

11. The reactor of claim 1, wherein said conductive channels are connected using internal conducting paths to a common bus path for each polarity.

12. The reactor of claim 1, wherein said monolith further comprises integral structural support ligaments.

13. The reactor of claim 12, wherein portions of said structural support ligaments within said conductive channels are coated with conductive media.

14. The reactor of claim 1, wherein said monolith further comprises structural support ligaments and wherein a portion of said structural support ligaments are removed at one or both ends of said monolith.

15. The reactor of claim 1, wherein end regions of said reactor are coated with an insulating encapsulent.

16. The reactor of claim 1, further comprising a matt support exterior to said monolith.

17. The reactor of claim 15, wherein said matt comprises an intumescent insulating matt.

18. The reactor of claim 1, further comprising an insulating seal provided over wire terminations to prevent voltage leaks.

19. The reactor of claim 1, further comprising a reactor housing for housing said element.

20. The reactor of claim 1, further comprising a wire system for connecting said element to a power source.

21. The reactor of claim 20, wherein said wire system comprises a strain relief system to achieve highly reliable connections with said element.

22. The reactor of claim 1, wherein end portions of said conductive channels are uncoated.

23. The reactor of claim 1, wherein conductive media is disposed in a staggered coating pattern so that alternating end portions of conductive channels remain uncoated.

24. The reactor of claim 1, wherein said monolith comprises a ceramic monolith having narrow conductive channels at individual parallel step levels.

25. The reactor of claim 1, wherein said monolith comprises a co-extruded ceramic-metal foil monolith.

26. The reactor of claim 1, further comprising:
a catalytic coating disposed upon exhaust channel interior walls.

27. A method for preparing a non-thermal plasma reactor element comprising:
extruding a monolith comprising a perimeter boundary wall and a plurality of substantially planar dielectric barriers separating a plurality of channels for forming exhaust channels and conductive channels;
selectively coating selected channels with a conductive material to form conductive channels; and
applying a barrier coating to said conductive channels.

28. The method of claim 27, wherein said selective coating and said applying a barrier coating comprises:
applying a first mask to said monolith;
applying a conductive coating;
allowing said conductive coating to dry;
firing said conductive coating;
removing said first mask;
applying a second mask to said monolith;
applying a barrier coating;
allowing said barrier coating to dry; and
firing said barrier coating.

29. The method of claim 27, further comprising:
providing electrical connections; and
inserting said element into a housing.

30. The method of claim 27, further comprising:
extruding said monolith with a perimeter boundary wall of increased wall thickness relative to said barriers for providing crush resistance and allowing robust mounting into a reactor housing.

31. The method of claim 27, further comprising:
tailoring frontal area and length of said monolith to achieve desired gas space velocity in accordance with engine emissions.

32. The method of claim 27, further comprising:
providing a monolith frontal area that is sufficiently large to achieve a low backpressure and adjusting monolith length to achieve a desired gas space velocity in accordance with particular engine emission systems.

33. The method of claim 27, further comprising:
plugging conductive channels and coated bus paths.

34. The method of claim 27, further comprising:
disposing a support between said monolith and a reactor housing.

35. The method of claim 27, further comprising:
providing an insulating barrier at opposite ends of said monolith.

36. The method of claim 27, further comprising:
distributing conductive media so that opposite end portions of each conductive channel remain uncoated.

37. The method of claim 27, further comprising:
distributing conductive media in a staggered pattern wherein said conductive channels remain uncoated at alternate ends.

38. The method of claim 27, further comprising:
disposing a catalytic coating on exhaust channel interior walls.

39. The method of claim 27, further comprising:
extruding a ceramic monolith having conductive channels at parallel step levels and centered exhaust channels substantially across the full width of each channel;
coating conductive channel walls with conductive material;
firing;
optionally, cutting off a slight portion at each conductive channel end to assure electrical isolation between channels; and
providing electrical connections.

40. The method of claim 27, further comprising:
co-extruding a ceramic substrate with metallic foils providing conductive channels that are integrally covered by dielectric material;
firing the co-extruded ceramic-metallic foil substrate;
optionally, separating the substrate into desired lengths; and
providing electrical connections.

41. The method of claim 40, further comprising:
providing electrical connections along a side of said substrate by running the metallic foil outside ceramic edges during extrusion.

* * * * *